A. A. ALBRIGHT.
FILTER.
APPLICATION FILED SEPT. 9, 1911.
1,050,051.
Patented Jan. 7, 1913.
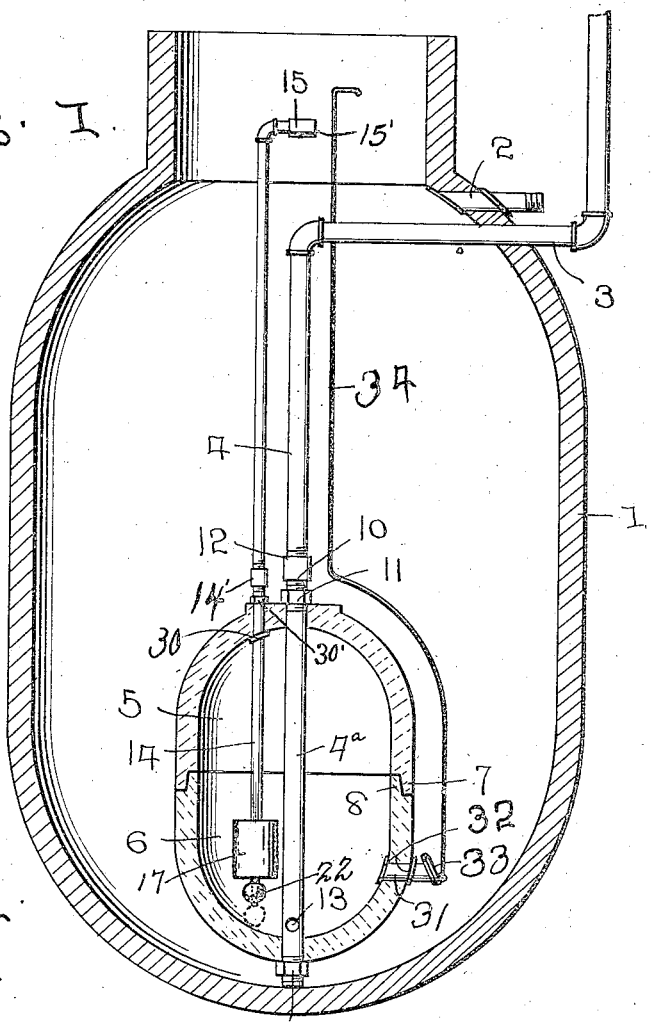
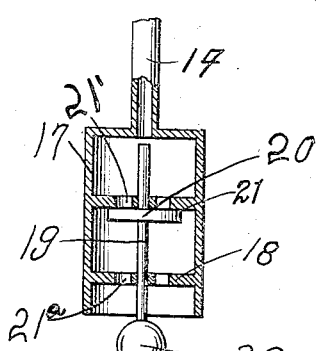
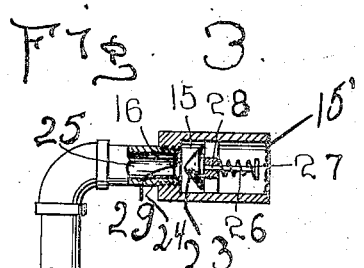
WITNESSES:
Thos. W. Riley
M. Newcomb
INVENTOR
A. A. Albright
BY
W. J. FitzGerald
Attorneys

UNITED STATES PATENT OFFICE.

ALBERT A. ALBRIGHT, OF MUNCIE, INDIANA, ASSIGNOR OF ONE-HALF TO COURT L. VAN ARSDOL, OF MUNCIE, INDIANA.

FILTER.

1,050,051.  Specification of Letters Patent.  Patented Jan. 7, 1913.

Application filed September 9, 1911. Serial No. 648,441.

*To all whom it may concern:*

Be it known that I, ALBERT A. ALBRIGHT, citizen of the United States, residing at Muncie, in the county of Delaware and State of Indiana, have invented certain new and useful Improvements in Filters; and I do hereby declare the following to be a full, clear, and exact description of the invention, such as will enable others skilled in the art to which it appertains to make and use the same.

This invention relates to filters, and it more particularly relates to the class of filters, adapted to be submerged within a cistern or the like, in connection with a pump.

An object of the invention is to provide a filter of this character which may be quickly and easily connected to a water supply pipe of a pump.

A further object of the invention is to provide a filter of this character which, when connected with a pump pipe, may be easily inserted in a cistern and submerged in the water contained therein, through the instrumentality of said pump pipe.

A further object of the invention is to provide a filter of this character composed of interlocking porous parts which, when united, form a closed filter chamber, and which may be easily connected and disconnected from the pump pipe, for cleaning, repairing, replacing or renewing of the several elements.

Another object is to provide a filter having an inlet valve connected therewith, and having a cut-out valve or water in-take valve, for rendering the filter inoperative when desirable.

A still further object is to provide a filter of this character which, when submerged within a cistern, is supported above the bottom of the cistern, and above the sediment thereof; thereby allowing free access of water to and through its porous bottom, as well as through its porous sides and top surfaces, and a still further object is to provide means for creating a partial vacuum within the filter, and thereby hastening the percolation of water through the porous walls of the filter chamber.

Other objects and advantages will be hereinafter more clearly set forth in the specification and pointed out in the claim.

In the accompanying drawings, which are made a part of this application, Figure 1 is a vertical sectional view through a cistern having my improved filter therein, said filter being shown in section and connected to the lower end of a water outlet pipe of a pump (said pump not being shown). Fig. 2 is an enlarged detail view of the air-supply pipe having a valve-chamber and valve secured therein, the valve-chamber being shown in vertical section, and, Fig. 3 illustrates a modified form of air-controlling valve, adapted to be connected to the upper end of the air-supply pipe.

Referring to the drawings, in which similar reference numerals designate corresponding parts throughout the several views, 1 represents the cistern having the ordinary overflow pipe 2 near the upper portion thereof. The water outlet pipe, which comprises a horizontal portion 3 and a vertical portion 4, extends through the upper portion of the cistern and extends downwardly, having my improved filter connected at the bottom thereof. This filter is composed of upper and lower sections 5 and 6 respectively, which are substantially hemispherical in form and have their circular edges provided with outer and inner flanges 7 and 8, respectively, the flange of the upper section 5 overlapping the flange of the lower section 6, thus forming a water tight connection between said sections, and forming a chamber therewithin. The filter is held in position above the bottom of the cistern by means of a nut 9 near the lower end of the portion of pipe 4ª, which is secured to the lower end of the outlet pipe 4. This pipe 4ª extends through the sections 5 and 6 and secures them together, the lower section 6 resting against the upper face of the nut 9. The lower end of the pipe 4ª rests upon and is inclosed by the bottom of the cistern; but it may be desirable to plug the said lower end, for best results. The nut 11 is secured onto the outer end of the pipe 4ª, threaded at 10, and said nut 11 has its lower surface in contact with the upper filter member 5, so that the filter members 5 and 6 are clamped securely together by means of the nuts 9 and 11 on the pipe section 4ª.

The pipe sections 4 and 4ª are secured together by a suitable connecting sleeve 12 above the nut 11. The pipe 4ª is provided with one or more intake-openings 13 which are preferably located at a low point within the filter, for a purpose to be hereinafter made known.

The sections 5 and 6 of the filter are composed of suitable porous material, which is capable of filtering the water as it percolates through the walls to the interior thereof, whence it may be drawn or forced out, through the pipe sections 3, 4 and 4$^a$, by means of a pump or the like.

A suitable air-supply pipe 14 extends through an aperture in the upper section 5 of the filter and continues in an upward direction from the filter, to a point slightly above the maximum water level, or above the overflow pipe 2. The lower end of the air-supply pipe 14 is provided with an air-regulating device, or valve mechanism, consisting of a valve chamber 17, and a valve 20, seated on the valve stem 19, the latter carrying a float at its lower end. The valve chamber is provided with an upper partition or valve seat 21 having openings 21', and the lower valve seat 18 having openings 21$^a$. The float 22, when submerged in water, has sufficient buoyancy to raise and support the valve stem 19 and valve 20, and thereby to hold the valve 20 in contact with the under side of the valve seat 21, thus closing the openings 21'. When the float 22 is not submerged, it gravitates with the valve stem and valve until the latter rests upon the valve seat 18 and closes the opening 21$^a$.

The air-supply pipe 14 may be formed of sections, and when two or more sections are provided, the meeting ends thereof are connected together in any proper manner, by a connecting sleeve or collar 14'. The air pipe 14 is held against vertical movement through the upper section 5, and in fixed relation thereto, by means of the collar or enlargement 30 upon the pipe 14, and by a nut 30' screwthreaded onto the upper end of the lower section of said pipe 14.

Seated within an aperture in the side wall of the lower section 6, is a short inlet pipe 31 having flanges 32 which are seated against the inner and outer surfaces of the member 6, for retaining the pipe 31 within the aperture and in fixed relation to the filter chamber. A cap-valve or closure 33 is hinged onto the outer end of the pipe 31, and when closed, prevents the water from entering the filter chamber, except by percolation through the walls thereof. When the cap valve is open, the water may enter from the cistern into the filtering chamber independently of the pores through the filtering walls. A lifter rod 34 is pivotally secured to the closure 33, at its bottom end, and extends upward approximately to the top of the cistern, where it may be easily grasped by an operator, for opening the closure 33. It may be desirable to thus raise the closure 33 and allow passage of water from the cistern into the filtering chamber, through the water inlet 31, when the water is sufficiently clear and pure to be used without filtering; and especially, when an increased supply of water is desired, as for fighting fire, etc. It is obvious that when only a small and occasional supply of water is desired, as for drinking purposes, the closure 33 is allowed to remain closed, and sufficient water has previously percolated through the walls of the filtering chamber to supply such limited demands; but when an unusually large supply of water is desired, the supply through the porous wall is insufficient, hence the necessity for the supply pipe 31.

It is obvious that in order to place the filter within the cistern, it is only necessary to connect the pipe 4 to the pipe 4$^a$ and to connect the upper portion of the pipe 14. The pipe 4 may then be used as an instrumentality by which the filter may be lowered into the cistern and submerged. The pipe 3 may then be connected to the pipe 4 as shown in Fig. 1.

In operation, water from the cistern percolates through the walls of the members 5 and 6 of the filtering chamber, and gravitates to the bottom of said chamber. After the filtering chamber has become filled or partially filled with water, it may be pumped or forced through the pump pipe 4, by any proper means (not shown), and it is obvious that as the water is pumped from the filtering chamber, more water percolates through the walls thereof, thereby providing a quantity of water within the chamber at all times. When, however, the pumping is continued unceasingly and briskly for a considerable length of time, the level of the water in the filtering chamber falls below the outlet port 13, whereby the flow of water through the pipe 4 will diminish. During the pumping or water lifting operation described, and during the continuous lowering of the water level in the filtering chamber, a partial vacuum is created above the water level within the filtering chamber, and air is sucked in through the pipe 14, rising upward through the water in the filtering chamber for relieving said partial vacuum. It will be understood that the suction created by the partial vacuum draws the air somewhat forcefully through the pipe 14, that is, with sufficient force to overcome the buoyancy of the float 22 and to unseat the valve 20, allowing the inflowing air to pass through the apertures 21'. When, however, the water level falls below the float 22, the latter will descend by gravity, allowing the valve 20 to co-act with the valve seat 18, for shutting off the air supply through the pipe 14. At this stage of the operation, the water having fallen below the top of the opening 13, air, with the water, will be sucked or forced through the pipe 4, thereby tending to create a vacuum in the entire filtering chamber. It is obvious that as the air pressure is decreased within the filtering chamber, the pressure of the water on the outer wall of the filtering chamber is relatively increased, and therefore, the percolation of water through said wall is increased, so that there is a quantity of water at the bottom of the filter at all times. It will be seen, therefore, that both air and filtered water will be drawn through the pipe 4 at the same time. When the operation of drawing water has ceased, the air is forced outward and upward from the filtering chamber, by the percolation of water thereinto, and said air, while rising in the form of bubbles, through the water in the cistern continues to stir and purify said water in a well known manner.

In lieu of the valve mechanism and float 22, as described, I may employ a valve mechanism such as illustrated in Fig. 3, connected with the top of the pipe 14, as shown. This device consists of a valve chamber 15 having a valve seat 24 in communication with the inlet opening 25, which communicates with the pipe 14. A valve 23, carried by valve stem 27, and adapted to close the valve seat 24, is movably seated within the chamber 15, the valve stem being slidable through the guide 28. A spring 26 is provided around the valve stem, and is operatively connected therewith for normally holding the valve 23 out of the valve seat 24. The operation of this modified valve mechanism is as follows: When the water level has become lowered to the opening 13, air as well as water, is drawn through the pipe 4. Since less force is required for drawing air than for drawing water, the forcing operation may be accelerated, thereby increasing the inflow of air through the pipe 14. This increased inflow overcomes the tension of the spring 26, by the action of the air upon the peripheral edges of the valve 23, thereby seating the valve in the valve seat 24 and thus stopping the inflow of air through the pipe 14. Continued passing of air through the pipe 4, tends to create a vacuum throughout the filtering chamber, which results, in the manner described, in hastening the percolation of water through the wall of the filtering chamber. It will be seen, therefore, that both air and filtered water will be drawn or forced through the pipe 4, simultaneously.

It will be seen that either the valve mechanism shown in Fig. 2, or that shown in Fig. 3, may be employed in connection with my improved filtering chamber, and that while the construction shown in Fig. 2 may be considered as less liable to get out of repair, that shown in Fig. 3 is more convenient of access for repairing, when necessary, and I may therefore employ either of these two valve mechanisms, as desired.

I do not limit my invention to the exact details of construction, combination, and arrangement of parts as herein shown and described; but my invention may only be limited by a reasonable interpretation of the following claim.

I claim:

The combination with a cistern and a water outlet pipe, said outlet pipe having its lower portion depending within said cistern, of a porous filter secured upon the depending portion of said pipe, said pipe communicating with the interior of the filter, and an air supply pipe secured to and projecting into the filter, an air supply controlling valve associated with said air supply pipe, and means independent of the pores of the filter for allowing water to flow from the cistern into the filter, said means being easily accessible by a person externally of the cistern.

In testimony whereof I have signed my name to this specification in the presence of two subscribing witnesses.

ALBERT A. ALBRIGHT.

Witnesses:
B. O. ASPY,
ED. A. DAVIS.